United States Patent
Truemper

(10) Patent No.: US 8,887,517 B2
(45) Date of Patent: Nov. 18, 2014

(54) METHOD FOR OPERATING AN AIRCRAFT COOLING SYSTEM AND AIRCRAFT COOLING SYSTEM

(75) Inventor: Torsten Truemper, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 383 days.

(21) Appl. No.: 13/381,060

(22) PCT Filed: Jun. 8, 2010

(86) PCT No.: PCT/EP2010/003431
§ 371 (c)(1),
(2), (4) Date: Feb. 15, 2012

(87) PCT Pub. No.: WO2010/149267
PCT Pub. Date: Dec. 29, 2010

(65) Prior Publication Data
US 2012/0137712 A1    Jun. 7, 2012

Related U.S. Application Data

(60) Provisional application No. 61/220,612, filed on Jun. 26, 2009.

(30) Foreign Application Priority Data

Jun. 26, 2009   (DE) .................. 10 2009 030 743

(51) Int. Cl.
| | |
|---|---|
| F25B 49/00 | (2006.01) |
| F25D 17/02 | (2006.01) |
| B64D 13/00 | (2006.01) |
| B64D 13/06 | (2006.01) |

(52) U.S. Cl.
CPC ................ *B64D 13/00* (2013.01); *F25D 17/02* (2013.01); *Y02T 50/56* (2013.01); *B64D 2013/0674* (2013.01); *B64D 2013/0629* (2013.01)
USPC .................................. 62/126; 62/56; 62/115

(58) Field of Classification Search
USPC ..................... 62/56, 115, 119, 126, 132, 239; 244/118.5
See application file for complete search history.

(56) References Cited

U.S. PATENT DOCUMENTS 2,694,537 A * 11/1954 Reichert ................... 244/118.5
5,513,500 A    5/1996 Fischer
(Continued)

FOREIGN PATENT DOCUMENTS

| DE | 43 403 17 A1 | 6/1995 |
|---|---|---|
| DE | 10 2006 005 035 B3 | 9/2007 |

(Continued)

OTHER PUBLICATIONS

International Search Report and Written Opinion, Apr. 15, 2011, PCT/EP2010/003431, Airbus Operations GmbH.

*Primary Examiner* — Melvin Jones
(74) *Attorney, Agent, or Firm* — Krieg DeVault LLP

(57) ABSTRACT

The invention relates to a method for operating an aircraft cooling system (10), comprising the steps guiding a cooling medium through a cooling circuit (26) which is coupled to a refrigerating machine (12) and to at least one cooling energy consumer (14a-14d) in order to supply cooling medium cooled by the refrigerating machine (12) to the cooling energy consumer (14a-14d), and controlling the operation of the refrigerating machine (12) by a control unit (42), such that coolant medium cooled by the refrigerating machine (12) to a predetermined cooling medium flow temperature is supplied to the cooling energy consumer (14a-14d). The method for operating an aircraft cooling system (10) further comprises detecting a cooling energy requirement of the cooling energy consumer (14a-14d) and transmitting a signal indicative of the cooling energy requirement of the cooling energy consumer (14a-14d) to the control unit (42). The operation of the refrigerating machine (12) is controlled by the control unit (42) in such a way that cooling medium which is guided through the cooling circuit (26) is cooled to a cooling medium flow temperature which is adapted to the cooling energy requirement of the cooling energy consumer (14a-14d).

14 Claims, 1 Drawing Sheet

(56) References Cited

U.S. PATENT DOCUMENTS

| | | | |
|---|---|---|---|
| 8,118,257 B2 * | 2/2012 | Wilmot et al. | 244/118.5 |
| 8,490,884 B2 * | 7/2013 | Scherer et al. | 236/1 B |
| 2005/0210910 A1 | 9/2005 | Rigney | |
| 2009/0090116 A1 | 4/2009 | Liu | |

FOREIGN PATENT DOCUMENTS

| | | |
|---|---|---|
| EP | 1 715 263 A2 | 10/2006 |
| RU | 2170192 | 7/2001 |
| WO | WO 2005/063578 A1 | 7/2005 |
| WO | WO 2008/025462 A1 | 3/2008 |

* cited by examiner

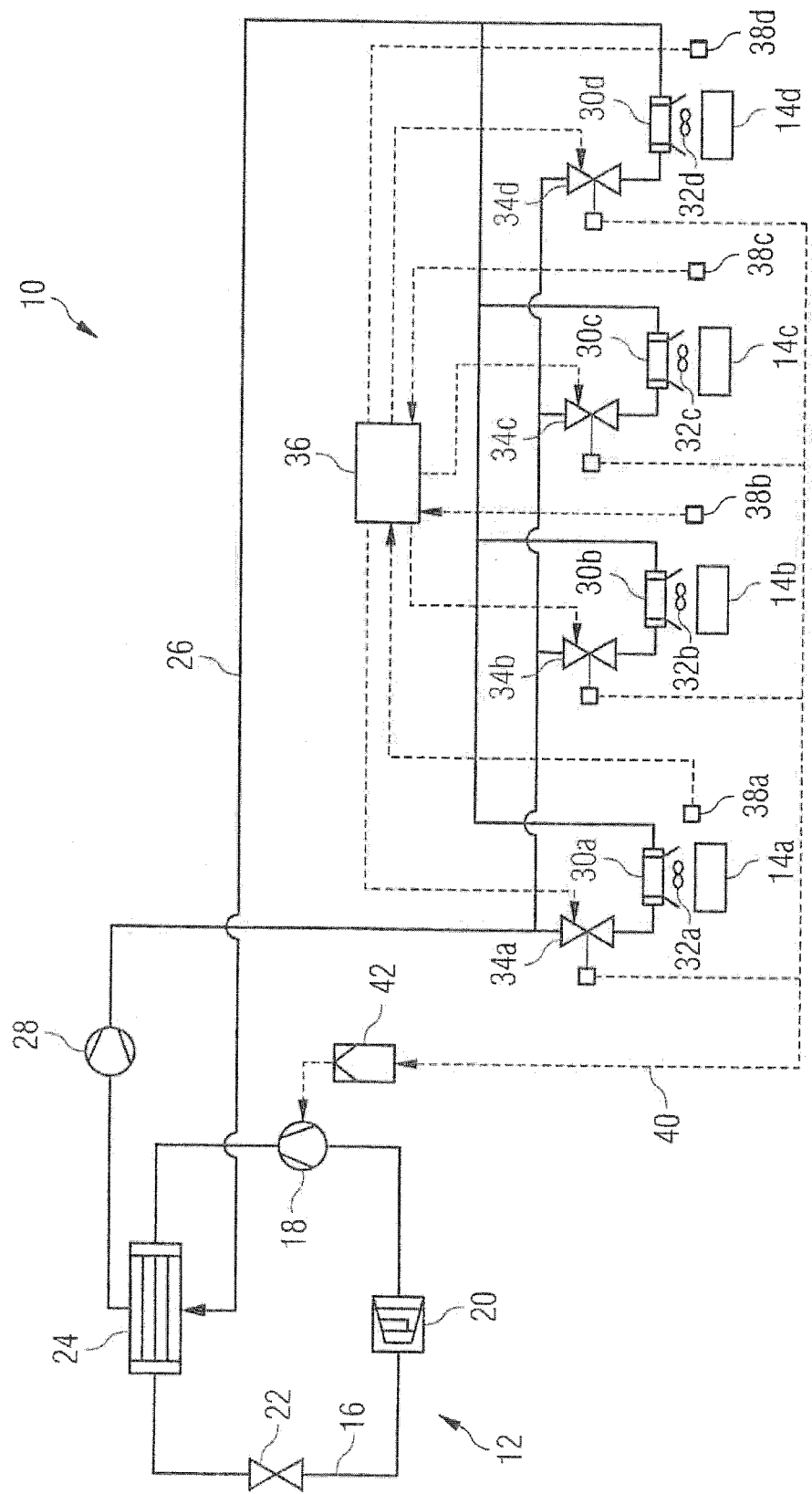

METHOD FOR OPERATING AN AIRCRAFT COOLING SYSTEM AND AIRCRAFT COOLING SYSTEM

CROSS REFERENCE TO RELATED APPLICATIONS

The present application is a §371 national stage patent application of PCT/EP2010/003431, filed Jun. 8, 2010, which claims the benefit of U.S. Provisional Application No. 61/220,612 filed Jun. 26, 2009 and claims priority to German Patent Application No. 10 2009 030 743.5 filed Jun. 26, 2009, each of which is incorporated herein by reference.

The invention concerns a method for operating an aircraft cooling system and an aircraft cooling system, the aircraft cooling system being, in particular, an aircraft liquid cooling system.

In modern aircraft, liquid cooling systems are increasingly used to supply cooling energy to the cooling energy consumers which are present on board the aircraft, e.g. food or heat-generating components. Aircraft liquid cooling systems which are known from the prior art, e.g. DE 43 403 17 A1 or DE 10 2006 005 035 B3, include a central refrigerating machine, the purpose of which is to cool a cooling medium which flows through a cooling circuit to a predetermined cooling medium flow temperature. The cooling circuit which the cooling medium flows through can be connected directly or only thermally, e.g. via a heat exchanger, to an internal cooling circuit of the refrigerating machine. Via the cooling circuit, the cooling medium which the refrigerating machine cools is fed to multiple consumers on board the aircraft, e.g. food or electrical, electronic or mechanical heat-generating components. The cooling energy is usually transferred from the cooling medium which flows through the cooling circuit to the cooling energy consumers via corresponding heat exchangers which are associated with the individual cooling energy consumers.

The cooling requirement of the cooling energy consumers on board an aircraft depends heavily on the ambient conditions to which the cooling energy consumers are exposed. In particular, the cooling energy requirement of the cooling energy consumers on board an aircraft is considerably greater in ground operation of the aircraft than in flight operation of the aircraft. To ensure proper cooling of all cooling energy consumers on board the aircraft even in ground operation of the aircraft, aircraft liquid cooling systems must be designed so that they can cover reliably even the maximum cooling energy requirement of the cooling energy consumers in ground operation of the aircraft. This is currently ensured by the refrigerating machine of an aircraft liquid cooling system providing cooling medium with a constant cooling medium flow temperature of about −9° C. during the whole operating time of the aircraft liquid cooling system, i.e. in both ground operation and flight operation of the aircraft.

Since the cooling energy requirement of the cooling energy consumers on board an aircraft is significantly less in flight operation of the aircraft than in ground operation of the aircraft, operation of an aircraft liquid cooling system with a constant cooling medium flow temperature which is adapted to the case of ground operation necessarily results in excess capacity of cooling energy at the cooling energy consumers in the case of flight operation. To avoid supplying excessive cooling energy to the cooling energy consumers, therefore, in flight operation of the aircraft the cooling medium volume flow to the cooling energy consumers is reduced by closing corresponding consumer control valves which are associated with the individual cooling energy consumers.

However, the result of the serious difference of cooling requirement between ground operation and flight operation of the aircraft is that the control behaviour of the consumer control valves is no longer continuous in flight operation of the aircraft, because of the large necessary proportional band. Instead, it can be necessary to clock the consumer control valves permanently between valve positions in which the consumer control valves open between 0 and 20% of their maximum flow cross-section. Such discontinuous valve operation can have a negative effect on the lifetime of the consumer control valves, and affect operation of the cooling energy consumers and the refrigerating machine of the aircraft liquid cooling system. Also, in flight operation of the aircraft the refrigerating machine of the aircraft liquid cooling system works in an unfavourable range with respect to energy.

Finally, the low cooling medium flow temperature in flight operation of the aircraft results in icing of the heat exchangers which are connected to the cooling circuit of the aircraft liquid system and associated with the individual cooling energy consumers. It is therefore necessary to de-ice the heat exchangers at predetermined time intervals of about 30 minutes. During the de-icing cycles, the cooling energy consumers require additional energy for the de-icing process. Additionally, to drain a heat exchanger effectively during de-icing, the direction of rotation of a fan which is associated with the heat exchanger, and which in normal operation of the heat exchanger conveys, through the heat exchanger, air to be cooled by cooling energy transfer from the cooling medium flowing through the heat exchanger, must be reversed, and an optimised fan running and stopping profile must be run. However, the associated relatively fast changes of rotational speed are undesirably audible in the passenger area of the aircraft.

The invention is based on the object of giving a method for operating an aircraft cooling system and an aircraft cooling system, which make operation of the aircraft cooling system appropriately to the cooling energy requirement possible.

To achieve this object, in a method according to the invention for operating an aircraft cooling system, a cooling medium is guided through a cooling circuit, which is connected to a refrigerating machine and to at least one cooling energy consumer, to supply cooling medium cooled by the refrigerating machine to the cooling energy consumer. The refrigerating machine can be a central refrigerating machine, which supplies multiple cooling energy consumers with cooled cooling medium via the cooling circuit. Cooling energy can be transferred from the cooling circuit to the at least one cooling energy consumer by means of, for example, a corresponding heat exchanger which is associated with the cooling energy consumer. As the cooling medium, preferably a liquid cooling medium, e.g. water, Galden® or similar, is used.

The operation of the refrigerating machine is controlled by a control unit in such a way that cooling medium which is cooled by the refrigerating machine to a predetermined cooling medium flow temperature is supplied to the cooling energy consumer. In other words, under the control of the control unit the refrigerating machine supplies cooling medium cooled to a predetermined cooling medium flow temperature to the cooling circuit, and via the cooling circuit to the cooling energy consumer. The control unit can be implemented in the form of an electronic control unit, for example.

Additionally, in the method according to the invention for operating an aircraft cooling system, a cooling energy requirement of the at least one cooling energy consumer is detected, and a signal indicative of the cooling energy requirement of the cooling energy consumer is transmitted to the control unit which controls the operation of the refrigerating machine. The control unit then controls the operation of the refrigerating machine on the basis of this signal, in such a way that cooling medium which is guided through the cooling circuit is cooled by the refrigerating machine to a cooling medium flow temperature which is adapted to the cooling energy requirement of the cooling energy consumer.

In the method according to the invention for operating an aircraft cooling system, it is ensured that in all operating states of the cooling system, i.e. in both the ground operation case and the flight operation case, cooling medium with a cooling medium flow temperature which is adapted to the cooling energy requirement of the cooling energy consumer is always supplied to the cooling energy consumer, which ensures that the cooling energy consumer is supplied with sufficient cooling energy in all operating situations. If the refrigerating machine is implemented in the form of a central refrigerating machine, which supplies multiple cooling energy consumers with cooling energy via the cooling circuit, preferably the cooling energy requirement of all cooling energy consumers which are supplied with cooling energy by the refrigerating machine is detected, and corresponding signals indicative of the cooling energy requirement of the cooling energy consumers are transmitted to the control unit. The control unit then controls the operation of the refrigerating machine in such a way that the cooling medium which is guided through the cooling circuit is cooled to a cooling medium flow temperature which is adapted to the cooling energy requirement of all cooling energy consumers. To ensure that all cooling energy consumers are properly supplied with cooling energy, in the control of the operation of the refrigerating machine the cooling energy consumer with the highest cooling energy requirement can be specially taken into account. For example, the cooling medium flow temperature can be adapted to the cooling energy requirement of the cooling energy consumption with the highest cooling energy requirement.

By adapting the cooling medium flow temperature to the actual cooling energy requirement of the cooling energy consumer(s), discontinuous operation of (a) consumer control valve(s) associated with the cooling energy consumer(s) can be avoided. Also, more energy-efficient operation of the refrigerating machine is made possible. Finally, at least in operating phases in which the cooling medium flow temperature is raised to about −1° C. by corresponding adaptation to the cooling energy requirement of the cooling energy consumer(s), de-icing of the heat exchanger(s) associated with the cooling energy consumer(s) can be omitted, since the increased cooling medium flow temperature prevents icing of the heat exchanger(s).

Preferably, as the signal indicative of the cooling energy requirement of the cooling energy consumer, a signal which indicates an open flow cross-section of a consumer control valve is used, the consumer control valve controlling the supply of cooling medium which is guided through the cooling circuit to the cooling energy consumer. For example, the consumer control valve can be arranged in a branch pipe which connects the cooling circuit to the cooling energy consumer. If, by the method according to the invention, multiple cooling energy consumers are supplied with cooling energy from a central refrigerating machine, in the control of the operation of the refrigerating machine signals indicating the open flow cross-section of multiple or all consumer control valves associated with the individual cooling energy consumers are preferably taken into account. The open flow cross-section of a consumer control valve/the consumer control valves is in any case detected during operation of an aircraft cooling system, to ensure proper open-loop or closed-loop control of the cooling energy feed to the cooling energy consumers. Thus carrying out the method according to the invention using a signal indicating an open flow cross-section of a consumer control valve as the signal indicative of the cooling energy requirement of the cooling energy consumer requires no additional sensors, and thus avoids increasing the system complexity and system weight.

In a preferred embodiment of the method according to the invention for operating an aircraft cooling system, the control unit controls the operation of the refrigerating machine in such a way that the cooling medium flow temperature is increased if an open flow cross-section of the consumer control valve falls below a predetermined lower threshold value. Alternatively or additionally, the control unit can control the operation of the refrigerating machine in such a way that the cooling medium flow temperature is increased if discontinuous, i.e. clocked, operation of the consumer control valve is required, in order to supply to the cooling energy consumer a cooling medium volume flow which is adapted to the cooling energy requirement of the cooling energy consumer. By such control of the operation of the refrigerating machine, discontinuous clocked operation of the consumer control valve, which affects the lifetime of the consumer control valve and the operation of the cooling energy consumers and refrigerating machine, is avoided or at least restricted in time. If multiple cooling energy consumers are supplied with cooling energy by means of a central refrigerating machine, again preferably the open flow cross-sections of multiple or all consumer control valves associated with the individual cooling energy consumers are taken into account in control of the operation of the refrigerating machine.

Preferably, in the method according to the invention for operating an aircraft cooling system, the control unit controls operation of the refrigerating machine in such a way that the cooling medium flow temperature is increased until an open flow cross-section of the consumer control valve reaches a predetermined upper threshold value. This ensures that the cooling medium flow temperature is not increased too much, or that proper supply of cooling energy to the cooling energy consumer is always ensured. If, by the method according to the invention for operating an aircraft cooling system, multiple cooling energy consumers are supplied with cooling energy from a central refrigerating machine, again preferably the open flow cross-sections of multiple or all consumer control valves associated with the individual cooling energy consumers are taken into account in control of the operation of the refrigerating machine.

The upper threshold value of the open flow cross-section of the consumer control valve is preferably between about 70 and 90%, in particular between about 80 and 90%, and specially preferably about 90% of the maximum flow cross-section of the consumer control valve. These large open flow cross-sections ensure that a large cooling medium volume flow reaches the cooling energy consumers. The cooling medium flow temperature can then be chosen to be correspondingly high, since the large cooling medium volume flow ensures that sufficient cooling energy is supplied to the cooling energy consumer. This makes possible specially energy-efficient operation of the refrigerating machine, and a significant reduction of the danger of icing of a heat exchanger associated with the cooling energy consumer. If, by the method according to the invention for operating an aircraft cooling system, multiple cooling energy consumers are supplied with cooling energy from a central refrigerating machine, again preferably the open flow cross-sections of multiple or all consumer control valves associated with the individual cooling energy consumers are taken into account in control of the operation of the refrigerating machines.

In a preferred embodiment of the method according to the invention for operating an aircraft cooling system, the control unit controls the operation of the refrigerating machine taking account of a system-dependent time constant. In other words, a control signal which the control unit outputs to control the operation of the refrigerating machine is damped by the system-dependent time constant. In this way, oscillation of a refrigerating machine component which the control unit controls is reliably avoided under the control of the control unit.

In principle, the control unit, to control the cooling medium flow temperature, can control the operation of multiple or all components of the refrigerating machine correspondingly. Preferably, however, the control unit controls the cooling medium flow temperature in particular by corresponding control of a compressor of the refrigerating machine. In this way, comparatively simple but reliable control of the operation of the refrigerating machine is made possible.

An aircraft cooling system according to the invention includes a refrigerating machine and a cooling circuit, which is connected to the refrigerating machine and at least one cooling energy consumer, and through which, in operation of the aircraft cooling system, a cooling medium can flow, to supply cooling medium cooled by the refrigerating machine to the cooling energy consumer. For example, the refrigerating machine can be in the form of a central refrigerating machine, which supplies multiple cooling energy consumers with cooling energy. In this case, preferably multiple branch pipes, which connect individual cooling energy consumers to the cooling circuit, branch off the cooling circuit. A controller of the aircraft cooling system according to the invention is adapted to control the operation of the refrigerating machine so that cooling medium cooled to a predetermined cooling medium flow temperature is supplied from the refrigerating machine to the cooling energy consumer.

Additionally, the aircraft cooling system according to the invention includes a device for detecting a cooling energy requirement of the cooling energy consumer, and a device for transmitting a signal indicative of the cooling requirement of the cooling energy consumer to the control unit. For example, the device for detecting a cooling energy requirement of the cooling energy consumer can be a suitable sensor such as a temperature sensor. To transmit a signal indicative of the cooling energy requirement of the cooling energy consumer to the control unit, for example a bus system, in particular a CAN bus system, can be used. The controller of the aircraft cooling system according to the invention is adapted to control the operation of the refrigerating machine so that the cooling medium which is guided through the cooling circuit is cooled to a cooling medium flow temperature which is adapted to the cooling energy requirement of the cooling energy consumer. In other words, the control unit is adapted to vary the cooling medium flow temperature of the cooling medium which flows through the cooling circuit, and thus to adapt it to the cooling energy consumption of the cooling energy consumer(s).

Preferably, the aircraft cooling system according to the invention also includes a device for detecting an open flow cross-section of a consumer control valve, and a device for transmitting a signal which indicates the open flow cross-section of the consumer control valve to the control unit, as the signal indicative of the cooling energy requirement of the cooling energy consumer. The consumer control valve is preferably a valve which controls the supply of cooling medium which is guided through the cooling circuit to the cooling energy consumer, and for example can be arranged in a branch pipe which connects the cooling circuit to the cooling energy consumer. If the aircraft cooling system according to the invention includes a central refrigerating machine which supplies multiple cooling energy consumers with cooling energy, preferably multiple consumer control valves associated with the individual cooling energy consumers, and corresponding devices for detecting the open flow cross-sections of these consumer control valves and for transmitting signals indicating the open flow cross-sections of the valves to the control unit, are also present.

Preferably, the control unit of the aircraft cooling system according to the invention is adapted to control the operation of the refrigerating machine so that the cooling medium flow temperature is increased if an open flow cross-section of the consumer control valve falls below a predetermined lower threshold value and/or if discontinuous operation of the consumer control valve is necessary to feed to the cooling energy consumer a cooling medium volume flow which is adapted to the cooling energy requirement of the cooling energy consumer. In the case of an aircraft cooling system with a central refrigerating machine and multiple cooling energy consumers which are supplied with cooling energy from the central refrigerating machine, the control unit is preferably adapted to take account of the open flow cross-section and/or the operating mode of multiple or all consumer control valves of the aircraft cooling system in controlling the refrigerating machine.

In a preferred embodiment of the aircraft cooling system according to the invention, the control unit is also adapted to control the operation of the refrigerating machine so that the cooling medium flow temperature is increased until an open flow cross-section of the consumer control valve reaches a predetermined upper threshold value. If the aircraft cooling system according to the invention comprises a central refrigerating machine and multiple cooling energy consumers which are supplied with cooling energy from the central refrigerating machine, the control unit is again preferably adapted to take account of the flow cross-sections of multiple or all consumer control valves of the aircraft cooling system in controlling the operation of the refrigerating machine.

The upper threshold value of the open flow cross-section of the consumer control valve is preferably between about 70 and 90%, in particular between about 80 and 90%, and especially preferably about 90% of the maximum flow cross-section of the consumer control valve.

Preferably, the control unit of the aircraft cooling system according to the invention is also adapted to control the operation of the refrigerating machine taking account of a system-dependent time constant. The system-dependent time constant damps the control signal which the control unit outputs to one or more components of the refrigerating machine to control the operation of the refrigerating machine, and thus prevents oscillation of the refrigerating machine component(s) which the control unit controls.

In a preferred embodiment of the aircraft cooling system according to the invention, the control unit is adapted, in particular, to control the cooling medium flow temperature of the cooling medium which is guided through the cooling circuit by controlling the operation of a compressor of the refrigerating machine.

A preferred embodiment of the invention is now explained in more detail on the basis of the attached drawing, which shows a schematic overview diagram of an aircraft cooling system.

An aircraft cooling system 10 shown in the FIGURE includes a central refrigerating machine 12, which supplies multiple cooling energy consumers 14a-14d with cooling energy. The refrigerating machine 12 has an internal cooling circuit 16, in which a compressor 18, a liquefier 20, an expansion valve 22 and a vaporiser 24 are arranged.

Via the vaporiser 24, which for example is in the form of a heat exchanger, the internal cooling circuit 16 of the refrigerating machine 12 is connected thermally to a cooling circuit 26 of the aircraft cooling system 10. A liquid cooling medium, e.g. water, Galden® or another suitable cooling medium, flows through the cooling circuit 26. To convey the liquid cooling medium through the cooling circuit 26, a pump 28 is arranged in the cooling circuit 26 downstream from the connection of the cooling circuit 26 to the internal cooling circuit 16 of the refrigerating machine 12.

The cooling energy is transferred from the cooling circuit 26 to the cooling energy consumers 14a-14d by means of the heat exchangers 30a-30d which are associated with the individual cooling energy consumers 14a-14d. The cooling medium which is guided through the cooling circuit 26 flows through the heat exchangers 30a-30d which are arranged in the cooling circuit 26, and which thus deliver cooling energy to an air flow which is conveyed through the heat exchangers 30a-30d by fans 32a-32d associated with the individual heat exchangers 30a-30d, and finally to the cooling energy consumers 14a-14d.

To control the cooling medium volume flow which is supplied to the heat exchangers 30a-30d and subsequently to the cooling energy consumers 14a-14d, corresponding consumer control valves 34a-34d are associated with the heat exchangers 30a-30d and thus the cooling energy consumers 14a-14d. The consumer control valves 34a-34d are, for example, implemented as solenoid valves with a continuously variable flow cross-section. The operation of the consumer control valves 34a-34d, i.e. an open flow cross-section of the consumer control valves 34a-34d, is controlled by a first control unit 36 on the basis of signals which are transmitted to the control unit 36 by sensors 38a-38d associated with the individual cooling energy consumers 14a-14d, said signals being indicative of the cooling energy requirement of the cooling energy consumers 14a-14d. The sensors 38a-38d can be implemented as temperature sensors, for example.

The first control unit 36 controls operation, i.e. the open flow cross-section of the consumer control valves 34a-34d, depending on the cooling energy requirement of the cooling energy consumers 14a-14d. In particular, the first control unit 36 controls the consumer control valves 34a-34d in such a way that they open a large flow cross-section if the sensors 38a-38d indicate a large cooling energy requirement of the cooling energy consumers 14a-14d, and that they open a small flow cross-section if the sensors 38a-38d indicate a small cooling energy requirement of the cooling energy consumers 14a-14d. In other words, by means of the consumer control valves 34a-34d the cooling medium volume flow, and thus the quantity of cooling energy which is supplied to the cooling energy consumers 14a-14d, can be controlled as desired. In this way, a sufficient supply of cooling energy to the cooling energy consumers 14a-14d is always ensured.

A signal which indicates the open flow cross-section of the consumer control valves 34a-34d is supplied via a CAN bus system 40 to a second control unit 42. The second control unit 42 processes the signal which indicates the open flow cross-section of the consumer control valves 34a-34d as a signal indicative of the cooling energy requirement of the cooling energy consumers 14a-14d. On the basis of this signal, the second control unit 42 controls the operation of the refrigerating machine 12, and in particular the operation of the compressor 18 of the refrigerating machine 12, in such a way that the cooling medium which is guided through the cooling circuit 26 of the aircraft cooling system 10 is cooled by the refrigerating machine 12 to a cooling medium flow temperature which is adapted to the cooling energy requirement of the cooling energy consumers 14a-14d. In other words, the temperature of the cooling medium which flows through the cooling circuit downstream of the evaporator 24 of the refrigerating machine 12 and upstream of the heat exchangers 30a-30d associated with the individual cooling energy consumers 14a-14d is adapted to the cooling energy consumption of the cooling energy consumers 14a-14d.

In particular, the second control unit 42 controls the operation of the compressor 18 of the refrigerating machine 12 so that the cooling medium flow temperature is increased until an open flow cross-section of the consumer control valves 34a-34d is 90% of the maximum flow cross-section of the consumer control valves 34a-34d. To prevent oscillation of the compressor 18 of the refrigerating machine 12, the control signal which the second control unit 42 outputs to the compressor 18 is damped by a system-dependent time constant.

In the shown embodiment of an aircraft cooling system 10, two control units 36, 42 are used to control the operation of the consumer control valves 34a-34d and of the refrigerating machine 12. However, it is understood that the aircraft cooling system 10 can also include only one control unit, which controls both the operation of the consumer control valves 34a-34d and the operation of the refrigerating machine 12, in particular the operation of the compressor 18 of the refrigerating machine 12. Similarly, the CAN bus system 40, which is used to transmit the signals indicating the open flow cross-section of the consumer control valves 34a-34d to the second control unit 2, can also be used to transmit the characteristic signals for the cooling energy requirement of the cooling energy consumers 14a-14d to the first control unit 36.

Furthermore, instead of the first control unit 36, multiple decentralised first control units which are associated with the individual cooling energy consumers 14a-14d, and which receive the signals from the sensors 38a-38d and control the consumer control valves 34a-34d depending on the cooling energy requirement of the cooling energy consumers 14a-14d on the basis of the signals which are transmitted to the first control units from the sensors 38a-38d, can be present. The signals indicating open flow cross-sections of the consumer control valves 34a-34d can then be transmitted from the decentralised first control units associated with the individual cooling energy consumers 14a-14d to the second control unit 42. The signals from the sensors 38a-38d to the decentralised first control units and the signals indicating the open flow cross-sections of the consumer control valves 34a-34d from the decentralised first control units to the second control unit 42 can again be transmitted via one CAN bus system, but if necessary via two separate CAN bus systems.

The invention claimed is:

1. Method for operating an aircraft cooling system, comprising the steps:
    guiding a cooling medium through a cooling circuit, which is connected to a refrigerating machine and to at least one cooling energy consumer, to supply cooling medium cooled by the refrigerating machine to the cooling energy consumer, and
    controlling the operation of the refrigerating machine by a control unit in such a way that cooling medium which is cooled by the refrigerating machine to a predetermined cooling medium flow temperature is supplied to the cooling energy consumer, characterized by the steps:
    detecting a cooling energy requirement of the cooling energy consumer,
    transmitting a signal indicative of the cooling energy requirement of the cooling energy consumer to the control unit, and
    controlling the operation of the refrigerating machine by the control unit, in such a way that cooling medium which is guided through the cooling circuit is cooled to a cooling medium flow temperature which is adapted to the cooling energy requirement of the cooling energy consumer.

2. Method according to claim 1, characterized in that as the signal indicative of the cooling energy requirement of the cooling energy consumer, a signal which indicates an open flow cross-section of a consumer control valve is used, the consumer control valve controlling the supply of cooling medium which flows through the cooling circuit to the cooling energy consumer.

3. Method according to claim 1, characterized in that the operation of the refrigerating machine is controlled by the control unit in such a way that the cooling medium flow temperature is increased if an open flow cross-section of the consumer control valve falls below a predetermined lower threshold value, and/or if discontinuous operation of the consumer control valve is required, in order to supply the cooling energy consumer a cooling medium volume flow which is adapted to the cooling energy requirement of the cooling energy consumer.

4. Method according to claim 1, characterized in that the operation of the refrigerating machine is controlled by the control unit in such a way that the cooling medium flow temperature is increased until an open flow cross-section of the consumer control valve reaches a predetermined upper threshold value.

5. Method according to claim 4, characterized in that the upper threshold value of the open flow cross-section of the consumer control valve is 90% of the maximum flow cross-section of the consumer control valve.

6. Method according to claim 1, characterized in that the control unit controls the operation of the refrigerating machine taking account of a system-dependent time constant.

7. Method according to claim 1, characterized in that the control unit, to control the cooling medium flow temperature, controls operation of a compressor of the refrigerating machine.

8. Aircraft cooling system with:
a refrigerating machine,
a cooling circuit, which is connected to the refrigerating machine) and at least one cooling energy consumer, and through which a cooling medium can flow, to supply cooling medium cooled by the refrigerating machine to the cooling energy consumer, and
a control unit, which is adapted to control the operation of the refrigerating machine so that cooling medium cooled to a predetermined cooling medium flow temperature is supplied from the refrigerating machine to the cooling energy consumer,
characterized in that
the aircraft cooling system) also includes a device for detecting a cooling energy requirement of the cooling energy consumer, and a device for transmitting a signal indicative of the cooling requirement of the cooling energy consumer to the control unit, and that the control unit is further adapted to control the operation of the refrigerating machine so that the cooling medium which is guided through the cooling circuit is cooled to a cooling medium flow temperature which is adapted to the cooling energy requirement of the cooling energy consumer.

9. Aircraft cooling system according to claim 8, characterized in that the control unit is adapted to use, as the signal indicative of the cooling energy requirement of the cooling energy consumer, a signal which indicates an open flow cross-section of a consumer control valve, the consumer control valve being adapted to control the supply of cooling medium which flows through the cooling circuit to the cooling energy consumer.

10. Aircraft cooling system according to claim 8, characterized in that the control unit is adapted to control the operation of the refrigerating machine in such a way that the cooling medium flow temperature is increased if an open flow cross-section of the consumer control valve falls below a predetermined lower threshold value, and/or if discontinuous operation of the consumer control valve is required, in order to supply to the cooling energy consumer a cooling medium volume flow which is adapted to the cooling energy requirement of the cooling energy consumer.

11. Aircraft cooling system according to claim 8, characterized in that the control unit is adapted to control the operation of the refrigerating machine in such a way that the cooling medium flow temperature is increased until a released flow cross-section of the consumer control valve reaches a predetermined upper threshold value.

12. Aircraft cooling system according to claim 11, characterized in that the upper threshold value of the open flow cross-section of the consumer control valve is 90% of the maximum flow cross-section of the consumer control valve.

13. Aircraft cooling system according to claim 8, characterized in that the control unit is adapted to control the operation of the refrigerating machine taking account of a system-dependent time constant.

14. Aircraft cooling system according to claim 8, characterized in that the control unit, to control the cooling medium flow temperature, is adapted to control operation of a compressor of the refrigerating machine.

* * * * *